(12) United States Patent
Layton

(10) Patent No.: US 6,265,839 B1
(45) Date of Patent: Jul. 24, 2001

(54) HOIST TRANSFER DRIVE SYSTEM HAVING X AND Y-LINEAR MOTORS

(76) Inventor: Howard Layton, 11 Falmouth Ct., Brookfield, CT (US) 06804

( * ) Notice: Subject to any disclaimer, the term of this patent is extended or adjusted under 35 U.S.C. 154(b) by 0 days.

(21) Appl. No.: 09/437,114

(22) Filed: Nov. 10, 1999

(51) Int. Cl.[7] ................................................. H02K 41/00
(52) U.S. Cl. ............................. 318/115; 318/135; 310/13
(58) Field of Search ..................... 318/115–135, 34–89, 318/560–696; 310/11–13; 414/751–753; 901/9, 20, 24; 395/88, 90; 74/479.01, 490.09, 424.8 R, 471 XY, 424.8 B; 248/913; 384/9, 12; 104/282–286, 292

(56) References Cited

U.S. PATENT DOCUMENTS

| | | | |
|---|---|---|---|
| 4,249,114 | * 2/1981 | Popov et al. | 318/115 |
| 4,714,400 | * 12/1987 | Barnett et al. | 414/751 |
| 5,081,593 | * 1/1992 | Pollack | 395/88 |
| 5,696,411 | * 12/1997 | Takei | 310/12 |
| 5,760,500 | * 6/1998 | Kondo et al. | 310/12 |
| 5,789,835 | * 8/1998 | Obara | 310/80 |
| 5,831,352 | * 11/1998 | Takei | 310/12 |
| 5,839,324 | * 11/1998 | Hara | 74/490.09 |
| 6,002,465 | * 12/1999 | Korenaga | 355/53 |
| 6,044,770 | * 4/2000 | Davey et al. | 104/282 |

* cited by examiner

Primary Examiner—Paul Ip
(74) Attorney, Agent, or Firm—Hopgood, Calimafde, Judlowe & Mondolino

(57) ABSTRACT

A drive system for transferring a work load suspended from a hoist from one work processing stage to another in a series of stages. Included in the system is an X-linear motor which causes the hoist to travel along a horizontal path running from stage to stage, and a Y-linear motor causing the hoist, when at a selected stage, to travel in a vertical path to lower the work load into the stage for processing and then raise the load so that it can travel to another stage. Power for the X-motor is supplied by an external source, but power for the Y-motor which is electromagnetically coupled to the X-motor is inductively derived from the X-motor, thereby obviating the need for a power cable for the Y-motor.

10 Claims, 3 Drawing Sheets

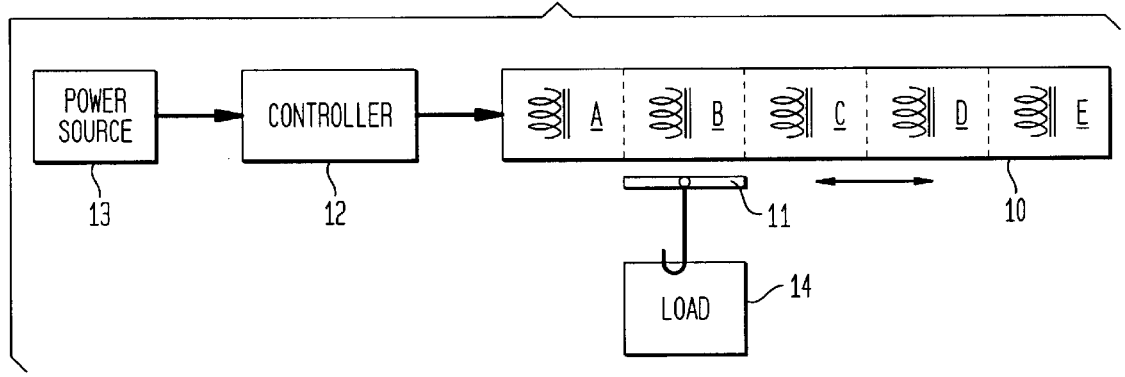
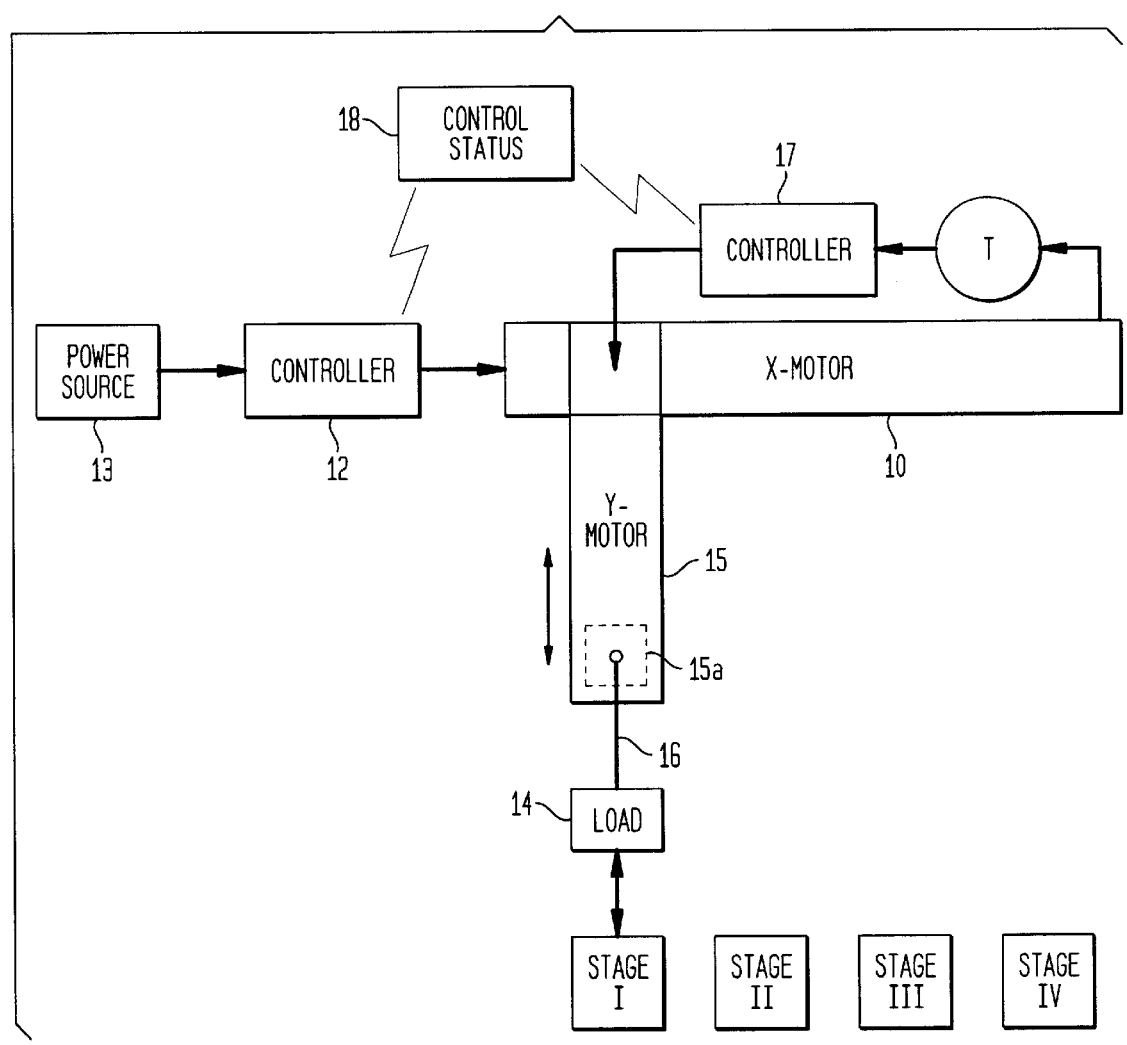

HOIST TRANSFER DRIVE SYSTEM HAVING X AND Y-LINEAR MOTORS

BACKGROUND OF THE INVENTION

1. Field of Invention

This invention relates generally to an automated drive system adapted to transfer a hoist from which a work load is suspended from one processing stage to the next in a series thereof, and more particularly to a system in which the hoist is caused by an X-linear motor to travel from stage to stage along a horizontal path, and is caused by a Y-linear motor at each stage to travel in a vertical path to lower the work load into that stage for processing therein and to then raise it for transfer to the next stage.

2. Status of Prior Art:

My prior U.S. Pat. No. 4,575,299 discloses an automated drive system for carrying out chemical processing operations sequentially at a series of work processing stages. In this drive system, a work load suspended from a hoist is caused to travel along a raised horizontal path from stage to stage, the hoist at each stage being lowered to enter the work load therein for processing and then raised so that it can then be transferred to the next stage.

The concern of the present invention is with the processing of substrates for producing microelectronic circuits, such as integrated circuit chips. In the processing of these substrates, it is necessary to transfer a work load of such chips sequentially from stage-to-stage in a series thereof.

The problem with existing motorized drive systems for this purpose is that they include rack and pinion mechanisms, drive gears, lead screws and other devices that are subjected to friction. The resultant abrading action on the contacting surfaces gives rise to fine particulate matter which becomes air borne and creates an atmosphere which contaminates the substrates being processed. Or the contaminants may migrate from their sources to contaminate the substrates. Such contamination cannot be tolerated, for it is damaging to the microelectronic circuits to be produced on these substrates.

A drive system in accordance with the invention includes an X-linear motor to cause a hoist from which a work load is suspended to travel from stage to stage along a horizontal path and a Y-linear motor to cause the hoist at each stage to travel in a vertical path to lower the work load into the processing stage and to then raise it for transfer to the next stage. Hence of prior art interest are the following patents.

- A. The Negishi U.S. Pat. No. 4,916,340 shows a movement guidance system useable in the manufacture of semiconductor devices in which two linear motors are provided, one driving a movable member in the X-direction, the other in the Y-direction. In the present specification the term X-linear motor refers to a motor which causes a movable member or hoist to travel along a horizontal path, and the term Y-linear motor refers to a motor which causes a movable member to travel in a vertical path.
- B. The patent to Hinds discloses a first linear motor to move a shuttle in the X-direction and a second linear motor to move the shuttle in the Y-direction.
- C. The Fritz U.S. Pat. No. 5,688,084 discloses a drive system for a machine tool having X and Y-linear motors.
- D. The Teramachi U.S. Pat. No. 4,788,477 shows a motor driven X-Y table employing a linear motor.
- E. The Toyoda U.S. Pat. No. 3,904,900 shows two pulse-operated linear motors arranged to transfer an object in the X and Y directions.
- F. The Ira U.S. Pat. No. 5,808,382 shows a motor drive for a machine tool having a primary linear motor and a secondary linear motor.

In all of the above-identified prior art patents which disclose X and Y-linear motors, each motor is separately supplied with operating power from an external source. In a drive system in accordance with the invention the X-motor is supplied with operating power from an external source whereas the Y-motor which is electromagnetically coupled to the X-motor inductively derives its operating power from the X-motor.

Also of prior art interest is my prior U.S. Pat. No. 4,466,454 which discloses an automatic work transfer system for conveying a basket carrying work through a row of processing stages at a work station in any desired sequence. The basket is lowered into a tank at each stage and oriented therein for processing for a predetermined dwell period, at the conclusion of which the basket is hoisted out of the tank and transferred to the next stage where the procedure is repeated.

The system includes a supporting rail laterally displaced from the row of stages and parallel thereto. Riding on the rail is a robot provided with a pair of vertical shafts supported on an elevator. Cantilevered from the shafts are a pair of arms which extend over the stages, the ends of the arms which extend over the stages, the ends of the arms being pivotally connected to a cross piece. Depending from the center of the cross piece is a rod terminating in a hand adapted to engage the handle of the basket.

Thus when the robot advances on the rail, the hand is then shifted along a horizontal X-axis to a position in general alignment with a selected stage, when the elevator is operated, the hand is raised or lowered with respect to the selected stage along a vertical Y-axis normal to the X-axis; and when the shafts are simultaneously rotated, the hand swings, but without rotation, relative to a Y-axis perpendicular both to the X and Y axis to orient the basket with respect to the stage. Separately controllable X, Y and Z motors are subject to programmed instruction appropriate to the processing to be carried out.

SUMMARY OF INVENTION

In view of the foregoing, the main object of this invention is to provide a drive system for transferring a work load suspended from a hoist sequentially from one work processing stage to the next in a series thereof, which system is free of contaminants and therefore is not damaging to the work pieces being processed.

More particularly, an object of this invention is to provide a drive system of the above type in which the hoist is advanced along a horizontal path from stage to stage by an X-linear motor and along a vertical path at each stage by a Y-linear motor.

A significant feature of a drive system in accordance with the invention is that the X and Y-linear motors are electromagnetically coupled whereby power to operate the Y-linear motor is derived from the X-linear motor. An advantage of this arrangement is that it obviates the need for a cable coupled to an external power source to supply power to the Y-linear motor.

Briefly stated, a drive system in accordance with the invention is adapted to transfer a work load suspended from a hoist sequentially from one work processing stage to the next in a series of stages. Included in the system is an X-linear motor which causes the hoist to travel along a horizontal path from stage to stage, and a Y-linear motor causing the hoist, when at a selected stage, to travel in a vertical path to lower the work load into the stage for processing and then raise the hoist so that it can travel to the next stage. Power for the X-motor is supplied by an external source but power for the Y-motor which is electromagnetically coupled to the X-motor is derived from the X-motor, thereby doing away with the need for a power cable for the Y-motor.

It is known to provide a cable-free motor operated hoist assembly. To this end, use is made of an electrically "live" rail that runs along the length of the hoist track. The horizontal and vertical drive motors receive electrical power from the rail by way of brushes that engage the live rail. While this arrangement is acceptable for many industrial applications, it is not at all acceptable in the context of chemically-processing substrates when flammable liquids and vapors are present. Friction between the brushes and the live rail not only gives rise to particulate contamination but may also generate sparks acting to ignite the flammable vapors. Hence the use of a live rail to supply power to the motors of a hoist assembly in a chemical processing system is interdicted.

BRIEF DESCRIPTION OF DRAWING

For a better understanding of the invention as well as other objects and further features thereof, reference is made to the following detailed description to be read in conjunction with the accompanying drawings, wherein:

FIG. 1 schematically illustrates the structure of a conventional linear motor;

FIG. 2 is a block diagram of a hoist transfer drive system in accordance with the invention employing X and Y-linear motors;

DESCRIPTION OF INVENTION

Figure 3:
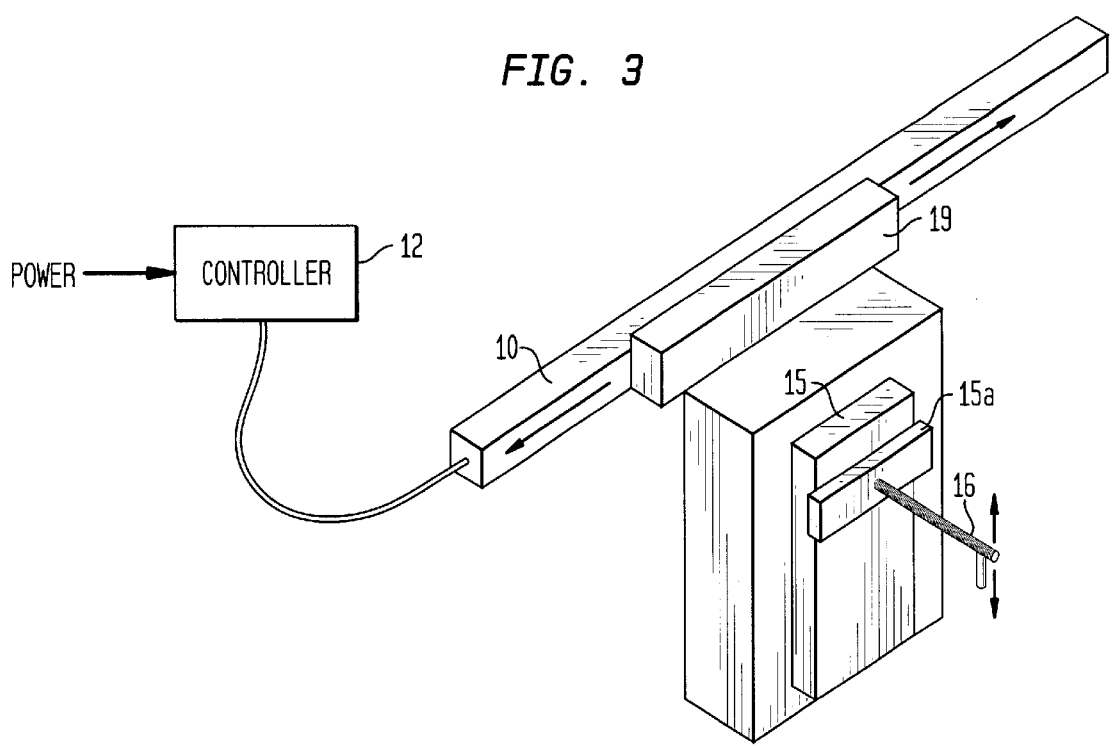
FIG. 3 illustrates the operative relationship between the X and Y-linear motors.

The Basic Motor:

The basic difference between a linear motor and a rotating motor is that in the latter, the magnetic structure is endless whereas in the former the magnetic structure is open-ended.

FIG. 1 illustrates a typical linear motor and it will be seen that it is formed by a linear track 10 having enclosed therein a series of electromagnetic coil sections A, B, C, D and E which are arranged in end-to-end relation to create a complete track whose length depends on the number of coil sections. Movable along track 10 in operative relationship to the coil sections is a ferromagnetic armature 11 which may be made of steel. Track 10 can be horizontally or vertically oriented, depending on the use to which the motor is put.

When coil sections A to E are energized through an electronic controller 12 from an external single-phase or polyphase power source 13, this causes armature 11 to advance along the track from section A to section E. Controller 12 functions to control this advance so that the armature may be brought to a halt at any selected coil section. Armature 11 supports a work load 14, and by means of controller 12 this load can be advanced along the track to stop at any position thereon. Thus the load may be carried to any selected work station in a series thereof along the track.

The System:

A system in accordance with the invention, as shown schematically in FIG. 2, includes a X-motor similar to that shown in FIG. 1 having a track 10 which is horizontally oriented to cause its armature 10A to travel along a horizontal path from stage to stage in a series of work processing stages I, II, III and IV.

Vertically mounted on armature 10A of the X-linear motor 10 and riding along its horizontal path is a Y-linear motor 15. Mounted on the movable armature 15A of the Y-linear motor 15 is a hoist 16 from which is suspended the work load 14. Armature 15A is movable in a vertical path so that the work load can be lowered into the processing stage with which it is then aligned and after being processed, can be raised for transfer along the horizontal path of the X-motor to the next stage. FIG. 2 shows work load 14 in alignment with stage I; hence upon completion of processing the work load will be transferred to the next processing stage which is stage II.

Y-motor 15 is not powered from a separate power source, in which event it would require a power cable for this purpose, but derives its power from X-motor 10. To this end the Y-motor is electromagnetically coupled by a transformer T to the X-motor in a manner to be explained in connection with FIGS. 3, 4 and 5. The input of transformer T is fed into the coil sections of the Y-motor via a controller 17.

In order to fully automate the operation of the system so that the work load can be transferred from stage to stage and be held in each stage for chemical or other processing for a time period appropriate to the processing to be carried out by this stage, it is necessary for controller 12 to cause the X-motor 10 to advance the load along the raised horizontal path at a desired rate to a selected position thereon, and it is also necessary for controller 17 to operate the Y-motor so that at each of the stages in the series, the work load is lowered therein for processing and then raised at properly timed intervals. This controlled time controlled period represents the dwell time of the work load in the processing stage.

To effect automated operation, the system includes a control station 18 provided with a programmed computer that sends out infrared signals to controllers 12 and 17 which are picked up by infrared sensors. These signals instruct the controllers in regard to the motors controlled thereby to carry out the processing operations in accordance with a predetermined processing agenda. In practice, communication between the control station and the controllers may be effected by microwave transmission or by laser beams.

Figure 4:
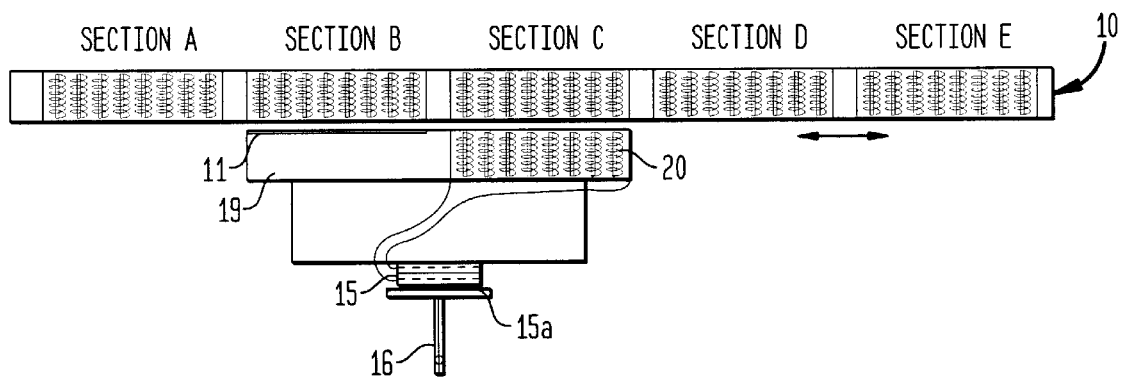
FIG. 4 shows how power to energizes the Y-motor is derived from the X-motor.
Figure 5:
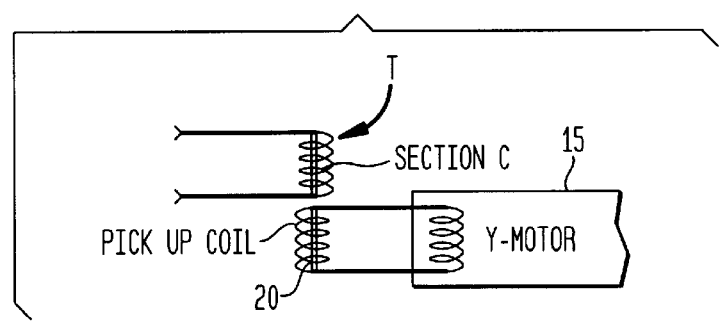
FIG. 5 shows the electromagnetic coupling between the X and Y-motor for supplying power to the Y-motor.
Figure 6:
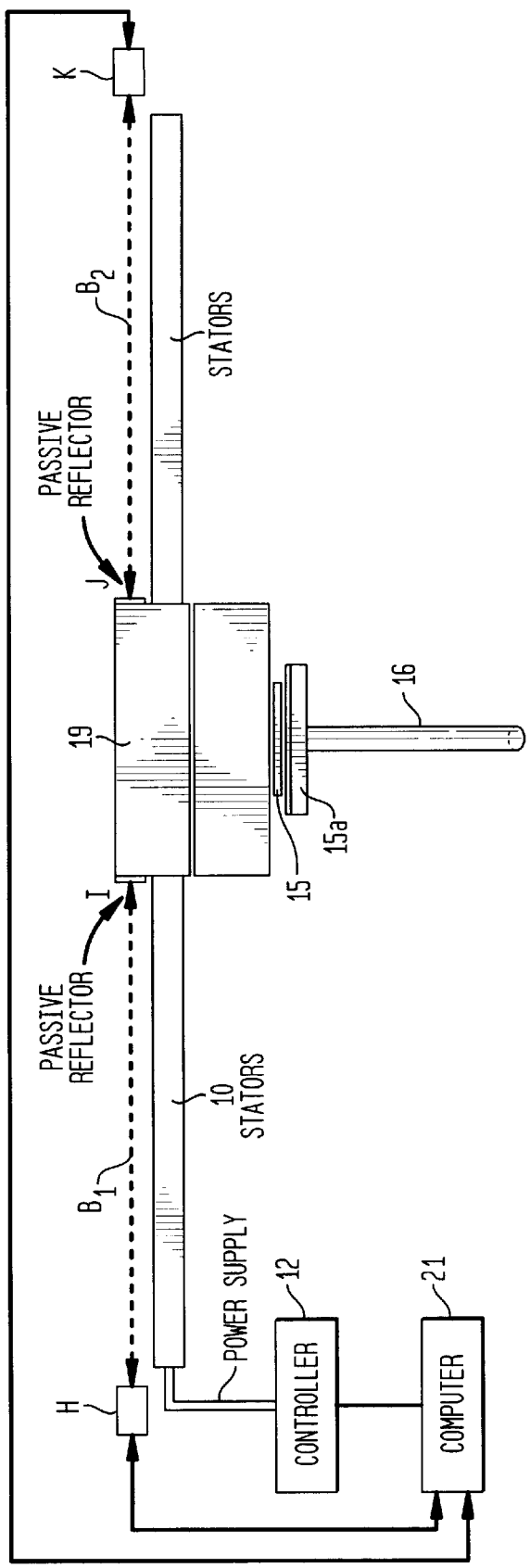

Electromagnetic Coupling:

As shown in FIGS. 3, 4, and 5, track 10 of the X-motor is provided with a series of electromagnetic coil sections A to E which run the full length of the track. Also provided is a carrier 19 which travels along track 10 and has installed therein armature 11 of the X-motor which steps from coil section A to coil section E as the carrier travels along the horizontal track.

Also housed in carrier 19 adjacent armature 11 is a pick-up electromagnetic coil 20 similar to a coil section in the X-motor 10. Coil 20 is so placed in the carrier that when armature 11 is in registration with any one of coil sections A to E, then pick up coil 20 is in registration with the next coil section in the series. Thus FIG. 4 shows armature 11 in registration with coil section B of the X-motor, hence pick-up coil 20 is now in registration with section C.

Pick-up coil 20, as shown in FIG. 5, acts as the secondary winding of transformer T whose primary winding is coil section C of the X-motor, or whatever other coil section is then in line with armature 11.

Pick-up coil 20 acting as the secondary of power transformer T supplies the power necessary to operate the Y-linear motor and is therefore connected to the input of this motor. In practice the pick up coil 20 should be as close as possible to the coil section of the X-motor in registration therewith.

Thus power for the Y-motor is inductively derived from the X-motor. The powered motors are controlled in accordance with a computer program to carry out processing of the work load in the successive processing stages of the system in a manner appropriate to the substrates or other work pieces being processed. The program is therefore tailored to the nature of the work pieces and how they are to be processed. Thus it is not necessary, where there are say five processing stages or stations in the series, that the work load in sequence stop at each stage, for in some cases it may skip one or more stages, or after being processed say, in stage C, to backtrack to stage B for reprocessing thereon before advancing to stage D.

It will be noted that the X and Y-linear motors cooperate without any gear works or other friction producing mechanisms that in operation may give rise to particulate contaminants; hence the work will be processed in a clean atmosphere.

Among the salient advantages of a system in accordance with the invention are the following:

- A. The absence in the hoist assembly of friction-generating mechanisms virtually eliminates the shedding of particulate contaminants.
- B. Operating safety is enhanced, for the system does not include exposed electrical contacts, live rails or naked conductors.
- C. Because the system makes no use of rack and pinion mechanisms or gear works normally associated with conventional rotary motors, this results in a marked reduction in noise level.
- D. Operation of the motors for the hoist without the use of umbilical cords or cables to supply power thereto eliminates generation of particulate contaminants resulting from flexing or coiling of these cables and by articulated tracks conveying the cables.
- E. Elimination of an interconnecting cable between an external power source and the mobile transfer hoist simplifies removal or replacement of the hoist for maintenance purposes.
- F. Maintenance requirements are significantly reduced and operating reliability is enhanced.

While there has been shown a preferred embodiment of a host transfer drive system having X and Y-linear motors in accordance with the invention, it will be appreciated that many changes and modifications may be made therein without, however, departing from the essential spirit thereof. Thus in practice a single controller with appropriate software to program the controller could be used to control both the X and the Y linear motor; rather than operate controller for each motor.

I claim:

1. A drive system for transferring a hoist supporting a work load from one work stage to another in a series of stages, said system comprising:

- A. an X-linear motor having a horizontal track defined by a series of electromagnetic coil sections which when energized from a power source cause a first armature to travel on the track along a horizontal path from stage to stage in said series of work stages;
- B. a Y-linear motor mounted on said first armature having a vertical track on which travels a second armature supporting said hoist;
- C. means to control power supplied to the X-motor to advance said first armature to a position along the horizontal track at which the hoist is in line with a respective work stage;
- D. means to control power supplied to the Y-motor to lower the hoist along the vertical track to cause the work load to enter the respective work stage to be processed therein and to then raise the hoist to effect transfer of the work load to another stage; and
- E. means to inductively derive the power supplied to the Y-motor from the X-motor.

2. A system as set forth in claim 1, in which power for operating the Y-motor is inductively derived from an electromagnetic coil section of the X-motor.

3. A system as set forth in claim 1, in which said means to inductively derive power from the X-motor includes an electromagnetic pick-up coil housed in a carrier movable along the horizontal track in which is also housed the first armature of the X-motor whereby when the first armature is in registration with a respective coil section of the X-motor, the pick-up coil is then in registration with an adjacent coil section to form a transformer to extract power from the X-motor.

4. A system as set forth in claim 1, in which the first armature of the X-motor and the second armature of the Y-motor are each formed of ferromagnetic material.

5. A system as set forth in claim 3, in which the pick-up coil is wound on a core, and each of said coil sections is wound on a core.

6. A system as set forth in claim 5, in which the core of the pick-up coil when this coil is in registration with a respective coil section is then adjacent the core of this section.

7. A system as set forth in claim 1, wherein power is supplied to the X-motor through a first electronic controller which governs the advance of the hoist along the horizontal path, and power is supplied to the Y-motor through a second electronic controller which governs the movement of the hoist along the vertical path.

8. A system as set forth in claim 7, in which automated control of the first and second controllers to carry out a predetermined processing agenda is effected by a programmed computer.

9. A system as set forth in claim 8, in which said computer communicates with the controllers via infrared ray transmission.

10. A system as set forth in claim 8, in which said computer communication with the controllers via laser beam transmission.

* * * * *